(12) United States Patent
Billhartz

(10) Patent No.: US 7,327,690 B2
(45) Date of Patent: Feb. 5, 2008

(54) WIRELESS LOCAL OR METROPOLITAN AREA NETWORK WITH INTRUSION DETECTION FEATURES AND RELATED METHODS

(75) Inventor: Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1067 days.

(21) Appl. No.: 10/217,243

(22) Filed: Aug. 12, 2002

(65) Prior Publication Data

US 2004/0028001 A1    Feb. 12, 2004

(51) Int. Cl.
  H04L 12/26    (2006.01)
  H04Q 7/24    (2006.01)
  G06F 11/30    (2006.01)
  G06F 12/00    (2006.01)

(52) U.S. Cl. .................. 370/245; 370/338; 370/349; 709/224; 726/23

(58) Field of Classification Search .............. 370/245, 370/338, 349; 709/224; 726/23
See application file for complete search history.

(56) References Cited

U.S. PATENT DOCUMENTS

| | | | |
|---|---|---|---|
| 5,412,654 A | 5/1995 | Perkins | 370/94.1 |
| 5,805,801 A * | 9/1998 | Holloway et al. | 726/22 |
| 5,901,284 A * | 5/1999 | Hamdy-Swink | 726/5 |
| 5,968,176 A * | 10/1999 | Nessett et al. | 726/11 |
| 5,978,669 A | 11/1999 | Sanmugam | 455/410 |
| 5,991,881 A * | 11/1999 | Conklin et al. | 726/22 |
| 6,047,330 A | 4/2000 | Stracke, Jr. | 709/238 |
| 6,070,246 A * | 5/2000 | Beser | 726/2 |
| 6,160,804 A | 12/2000 | Ahmed et al. | 370/349 |
| 6,282,546 B1 * | 8/2001 | Gleichauf et al. | 707/102 |
| 6,304,556 B1 | 10/2001 | Haas | 370/254 |
| 6,353,385 B1 * | 3/2002 | Molini et al. | 340/506 |
| 6,405,318 B1 * | 6/2002 | Rowland | 726/22 |
| 6,408,392 B2 * | 6/2002 | White | 726/26 |
| 6,681,331 B1 * | 1/2004 | Munson et al. | 726/23 |
| 6,745,333 B1 * | 6/2004 | Thomsen | 726/23 |
| 6,895,432 B2 * | 5/2005 | Ando et al. | 709/220 |
| 6,954,775 B1 * | 10/2005 | Shanklin et al. | 718/105 |
| 7,039,953 B2 * | 5/2006 | Black et al. | 726/14 |
| 7,093,291 B2 * | 8/2006 | Bailey | 726/23 |
| 7,134,141 B2 * | 11/2006 | Crosbie et al. | 726/23 |
| 7,194,004 B1 * | 3/2007 | Thomsen | 370/401 |

(Continued)

OTHER PUBLICATIONS

Kozup, *Secure Your WLAN Now*, *ZDNet Tech Update*, Nov. 13, 2001, available at http://techupdate.zdnet.com/techupdate/stories/main/0,14179,2835133,00.html.

(Continued)

*Primary Examiner*—Alpus H. Hsu
(74) *Attorney, Agent, or Firm*—Allen, Dyer, Doppelt, Milbrath & Gilchrist, P.A.

(57) ABSTRACT

A wireless local or metropolitan area network may include a plurality of stations for transmitting data therebetween and a policing station. The policing station may detect intrusions into the wireless network by monitoring transmissions among the plurality of stations to detect transmissions during an unauthorized period and generate an intrusion alert based thereon. The policing station may also detect intrusions based upon one or more of integrity check values which do not correspond with respective data packets, usage of non-consecutive media access control (MAC) sequence numbers by a station, and collisions of packet types and/or MAC addresses.

80 Claims, 11 Drawing Sheets

U.S. PATENT DOCUMENTS

| | | | | |
|---|---|---|---|---|
| 2003/0084329 | A1* | 5/2003 | Tarquini | 713/200 |
| 2003/0084331 | A1* | 5/2003 | Dixon et al. | 713/200 |
| 2003/0149891 | A1* | 8/2003 | Thomsen | 713/201 |
| 2003/0217283 | A1* | 11/2003 | Hrastar et al. | 713/200 |
| 2003/0233567 | A1* | 12/2003 | Lynn et al. | 713/200 |

OTHER PUBLICATIONS

Vamosi, *Go Away! How to Keep Hackers Out of Your Wireless Network*, CNET/ZDNet Reviews, Mar. 27, 2002, available at http://www.zdnet.com/anchordesk/stories/story/0,10738,2858228,00.html.

*Wireless LAN Security 802.11b and Corporate Networks*, Internet Security Systems, 2001, available at http://www.iss.net/support/documentation/whitepapers/iss.php.

Blackwell, *Serious WLAN Security Threats: Part II*, INT Media Group, Inc., 2002, available at http://www.80211-planet.com/columns/article/0,,1781_947571,00. html.

*Accessing Wireless Security with Airopeek*, WildPackets, Inc., 2001, available at http://www.wildpackets.com/products/airopeek/white_papers.

*WildPackets' Guide to Wireless LAN Analysis*, WildPackets, Inc., 2001, available at http://www.wildpackets.com/support/white_papers.

Zhang et al., *Intrusion Detection in Wireless Ad-Hoc Networks*, ACM MOBICOM, 2000.

Albers et al., *Security in Ad Hoc Networks: a General Intrusion Detection Architecture Enhancing Trust Based Approaches*, Proceedings of the International First Workshop on Wireless Information Systems (Wis-2002), Apr. 2002.

Kachirski et al., *Intrusion Detection Using Mobile Agents in Wireless Ad Hoo Networks*, IEEE Workshop on Knowledge Media Networking, 2002.

* cited by examiner

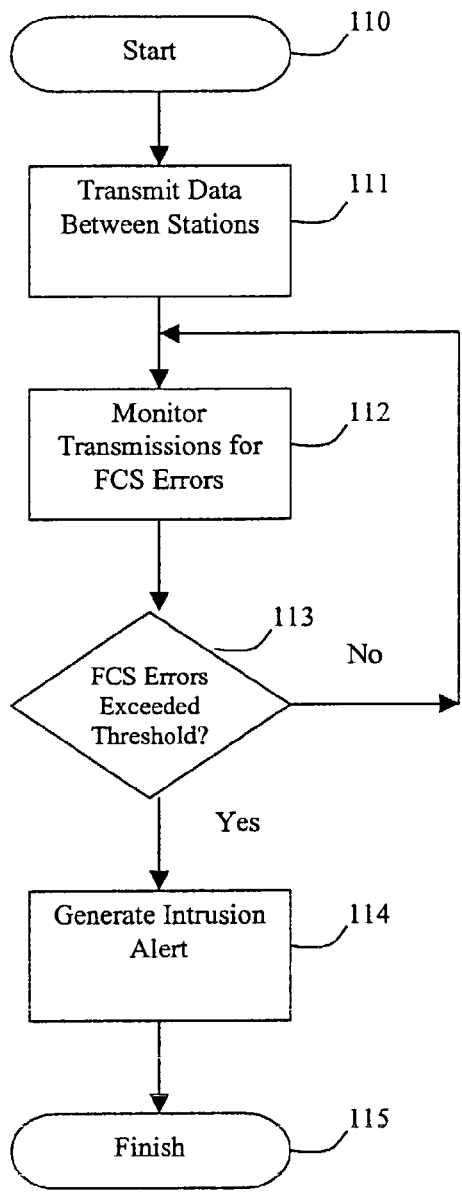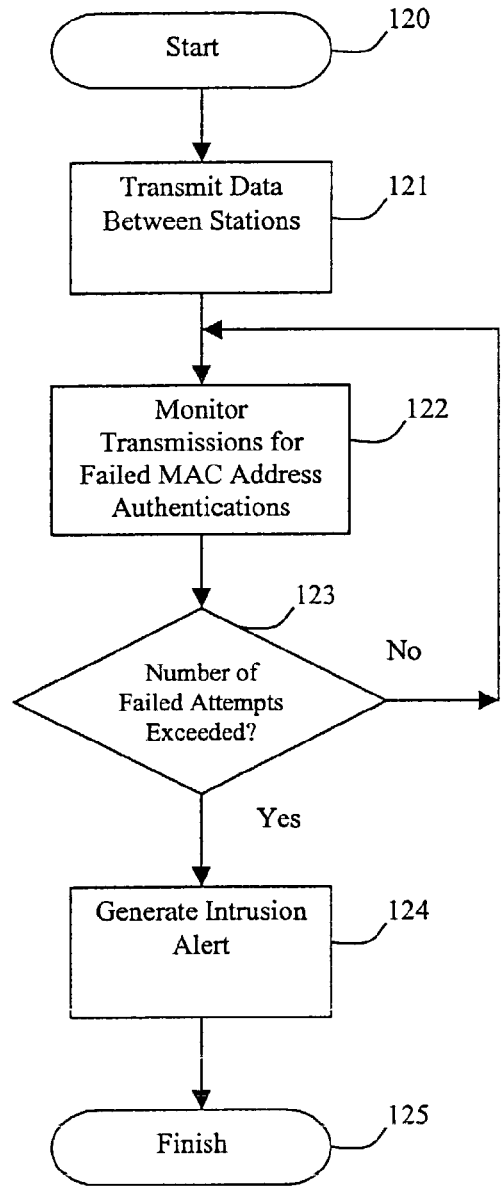
FIG. 11
FIG. 12

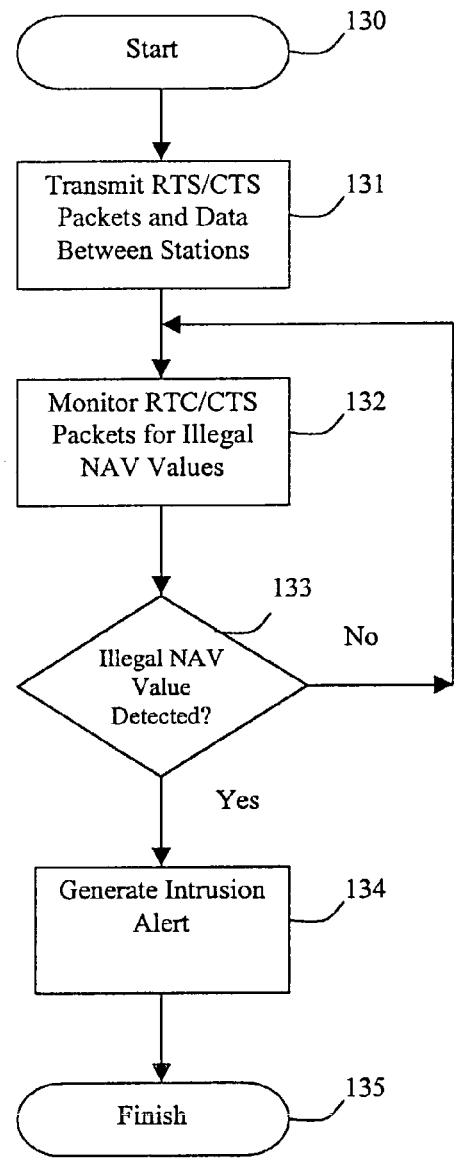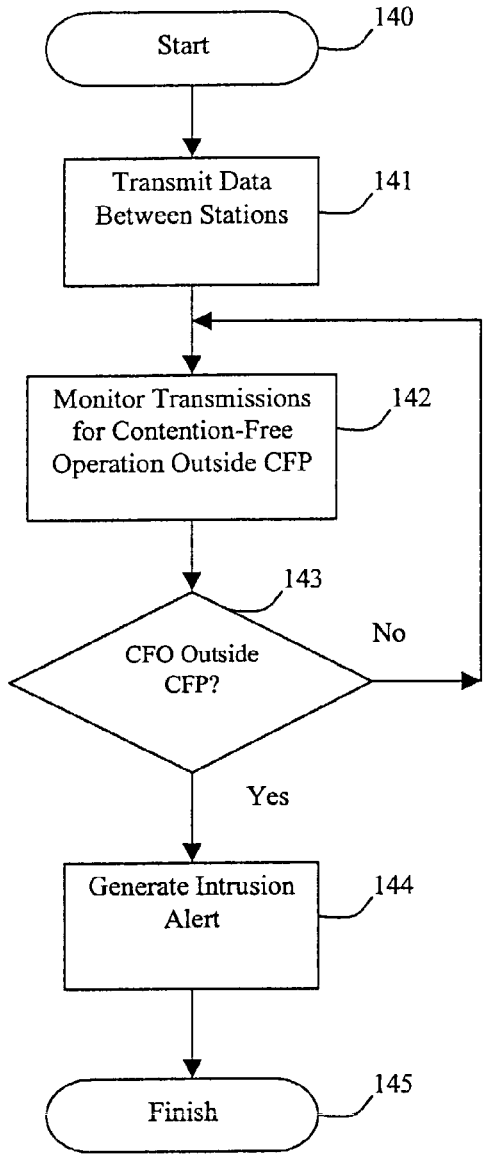
FIG. 13
FIG. 14

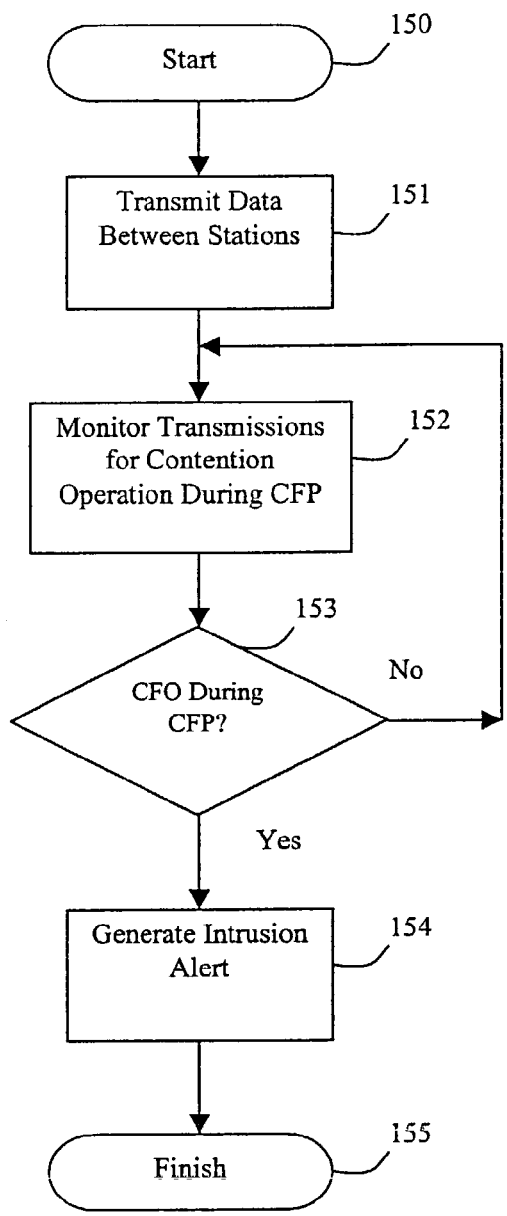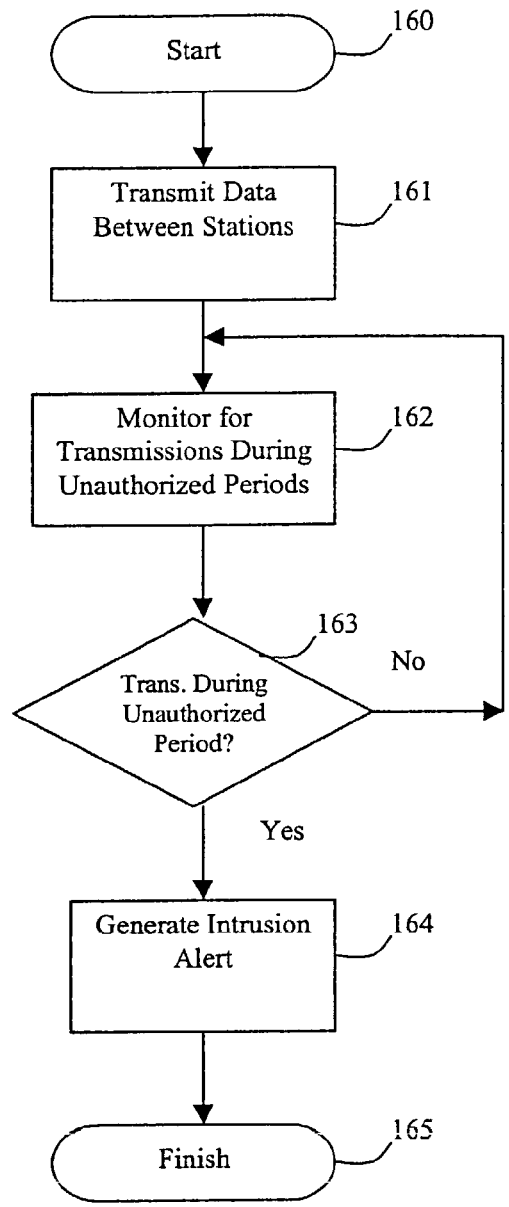
FIG. 15
FIG. 16

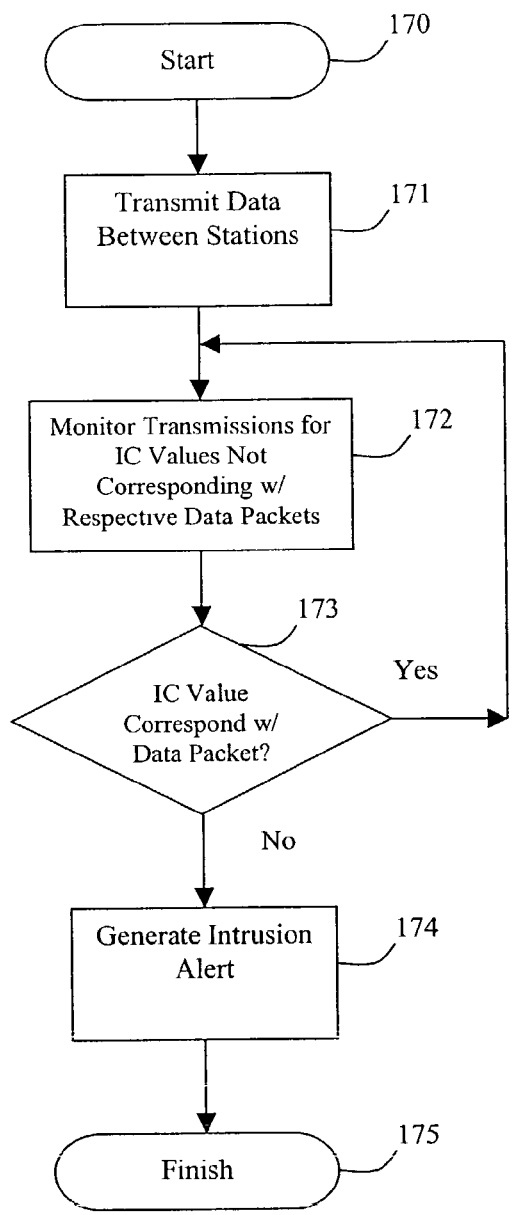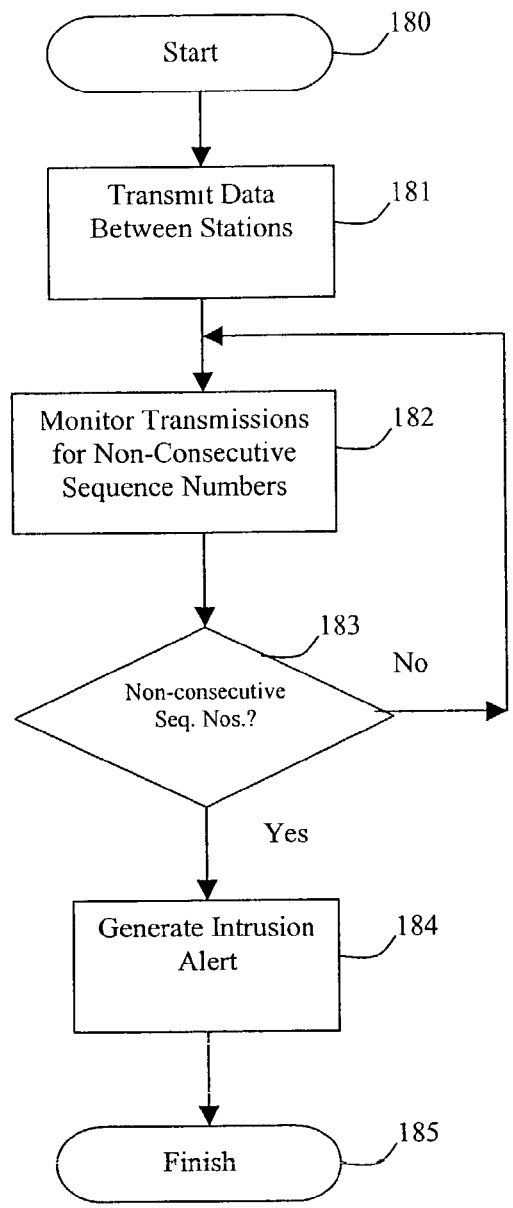
FIG. 17
FIG. 18

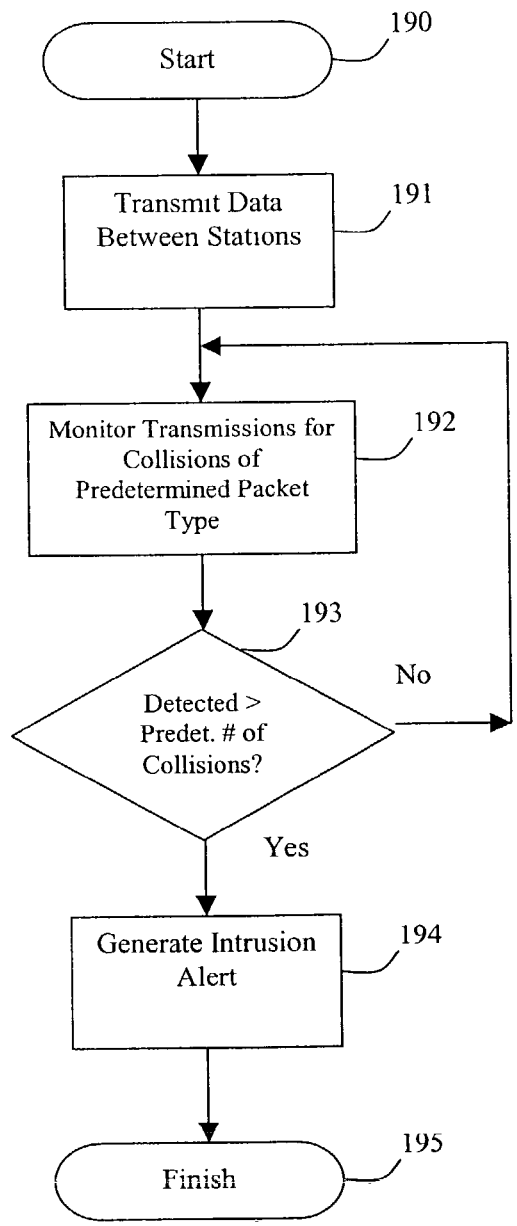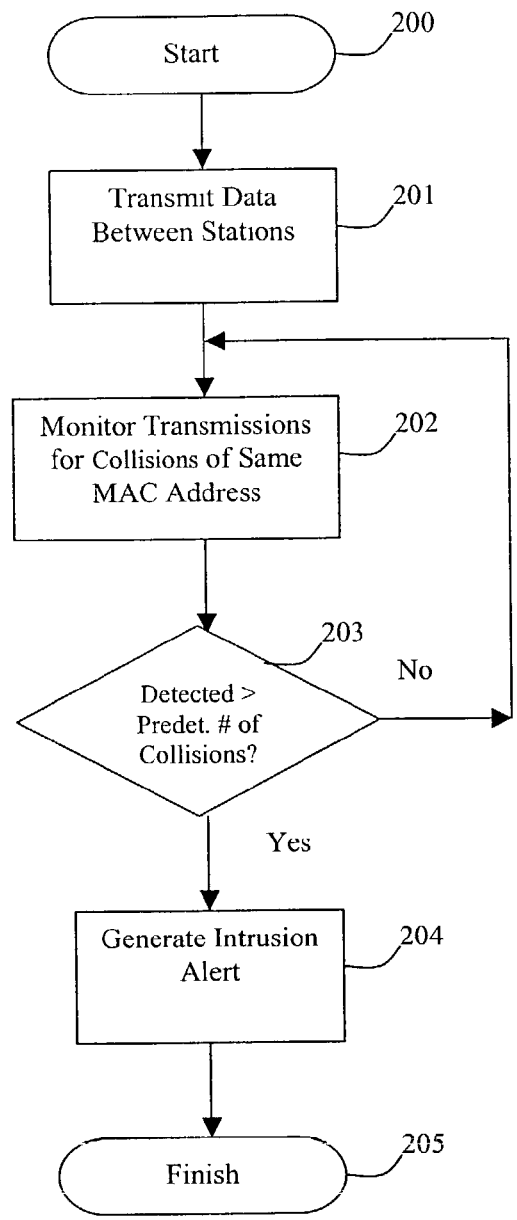
FIG. 19
FIG. 20

WIRELESS LOCAL OR METROPOLITAN AREA NETWORK WITH INTRUSION DETECTION FEATURES AND RELATED METHODS

FIELD OF THE INVENTION

The present invention relates to the field of wireless networks, and, more particularly, to wireless local and metropolitan area networks and related methods.

BACKGROUND OF THE INVENTION

Wireless networks have experienced increasing development over the past several years. Two particular examples are the wireless local area network (LAN), and the wireless metropolitan area network (MAN). In a basic service set (BSS), such networks include one or more wireless stations (e.g., a laptop with a wireless network interface card (NIC)) that communicate with an a point or base station (e.g., a server) via radio frequency signals, for example. The base station performs numerous functions, such as synchronization and coordination, forwarding of broadcast packets, and providing a bridge between the wireless LAN/MAN and a wired network, such as telephone network, for example.

In an extended service set (ESS), multiple base stations are included in the network. On the other hand, in some wireless LANs/MANs there may be no base stations at all, only wireless stations engaging in peer-to-peer communications with one another. This topology is called an independent basic service set (IBSS), and in an IBSS one of the wireless stations is typically elected to act as a proxy for the missing base station.

Perhaps the most significant reason for the popularity of wireless LANs/MANs is that such networks are relatively inexpensive and easy to deploy in that a wired infrastructure is not required. Yet, wireless LANs/MANs also have several significant drawbacks not found in wired networks. For example, because wireless LAN/MAN devices are so prevalent, such devices are readily available to would-be hackers who may attempt to intrude upon the network and compromise network security using an unauthorized wireless station (i.e., a rogue station). Also, if wireless LANs/MANs are operated too closely to one another the networks may intrude upon one another and cause network disruption, particularly if they share common channels.

One of the more prominent standards which has been developed for regulating communications within wireless LANs/MANs is that of the Institute of Electrical and Electronic Engineers' 802 LAN/MAN Standards Committee, entitled "IEEE Standards for Information Technology—Telecommunications and Information Systems—Local and Metropolitan Area Network—Specific Requirements—Part 11: Wireless LAN Medium Access Control (MAC) and Physical Layer (PHY) Specifications," 1999, which is hereby incorporated herein in its entirety by reference. In addition to providing wireless communications protocols, the 802.11 standard also defines a wired equivalent privacy (WEP) algorithm which is used to protect wireless signals from eavesdropping. More particularly, WEP provides for the encryption of messages to be sent between stations as well as an integrity check to ensure that the integrity of the originally transmitted messages has not been compromised.

While the WEP algorithm does provide some measure of network security, it does not detect or report potential intrusions into the network. Only recently have such intrusion detection systems been made available. These systems typically include security monitoring software to be installed on stations where intrusion detection is desired. Such software may attempt to detect intruders by monitoring and recording media access control (MAC) addresses or Internet protocol (IP) addresses and comparing them to known addresses of authorized network stations. Furthermore, such systems may observe when WEP is not enabled.

One particular example of an intrusion detection system from WildPackets, Inc. is called AiroPeek. AiroPeek searches for unauthorized rogue stations based upon ESS and BSS identifications (ESSIDs, BSSIDs) in use in the network. That is, a list of all authorized BSSIDs and ESSIDs in use in the network is created. A filter is then used to exclude all unauthorized stations. This filter is created by capturing normal network traffic and determining the data offset in an 802.11 frame corresponding to the ESSID or BSSID. AiroPeek also includes an alarm that is triggered on the basis of frame count. That is, if the frame count exceeds zero, the alarm is triggered (i.e., if any frames are detected from a rogue station, then the alarm is triggered). Further, AiroPeek can provide notification of an alarm via email or by using a modem to dial out of the system (e.g., to a pager).

Despite the advancements made by the above systems, some intrusions into a wireless LAN/MAN may still go undetected by such systems. That is, if a rogue station has obtained access to an authorized address and/or ID, for example, the above approaches may not detect the intrusion of the rogue station into the network.

SUMMARY OF THE INVENTION

In view of the foregoing background, it is therefore an object of the present invention to provide a wireless LAN/MAN with intrusion detection features and related methods.

This and other objects, features, and advantages in accordance with the present invention are provided by a wireless local or metropolitan area network which may include a plurality of stations for transmitting data therebetween and a policing station. The policing station may detect intrusions into the wireless network by monitoring transmissions among the plurality of stations to detect transmissions during an unauthorized period and generate an intrusion alert based thereon.

More particularly, the stations may transmit data in packets and generate respective integrity check values for transmission with each packet. As such, the policing station may further detect intrusions into the wireless network by monitoring transmissions among the plurality of stations to detect integrity check values which do not correspond with their respective data packets and generate an intrusion alert based thereon. Moreover, the data packets may be transmitted via a medium access control (MAC) layer, and the stations may also transmit a respective MAC sequence number with each data packet. Thus, the policing station may also detect intrusions into the wireless network by monitoring transmissions among the plurality of stations to detect usage of non-consecutive MAC sequence numbers by a station, and generate an intrusion alert based thereon.

Furthermore, each data packet may have a packet type associated therewith, so the policing station may additionally detect intrusions into the wireless network by monitoring transmissions among the plurality of stations to detect collisions of packets having a predetermined packet type and generate an intrusion alert based thereon. In particular, the predetermined packet type may include at least one of management frame packets (e.g., authentication, association, and beacon packets), control frame packets (e.g., request to send (RTS) and clear to send (CTS) packets), and data frame packets. Also, the threshold number of collisions of packets having the predetermined packet type may be greater than about three, for example. Moreover, the threshold number may be based upon a percentage of a total number of monitored packets having the predetermined packet type.

Each station may have a MAC address associated therewith to be transmitted with data sent therefrom. As such, the policing station may further detect intrusions into the wireless network by monitoring transmissions among the plurality of stations to detect collisions of a same MAC address, and generate an intrusion alert based thereon. By way of example, the threshold number of collisions of a same MAC address may be greater than about three.

In addition, the wireless network may have at least one service set identification (ID) associated therewith. Accordingly, the policing station may detect intrusions into the wireless network by monitoring transmissions among the plurality of stations to detect service set IDs associated therewith and generate an intrusion alert based upon one of the detected service set IDs being different than the at least one service set ID of the wireless network. Also, the plurality of stations may transmit over at least one channel, and the policing station may detect transmissions over the at least one channel not originating from one of the plurality of stations and generate an intrusion alert based thereon.

The policing station may further transmit the intrusion alert to at least one of the plurality of stations. Furthermore, the policing station be a base station, and it may also be a wireless station.

An intrusion detection method aspect of the invention is for a wireless local or metropolitan area network including a plurality of stations. More particularly, the method may include transmitting data between the plurality of stations and monitoring transmissions among the plurality of stations to detect transmissions during an unauthorized period. Further, an intrusion alert may be generated based upon detecting transmissions during the unauthorized period.

In addition, the plurality of stations may transmit data in packets and generate respective integrity check values for transmission with each packet. As such, the method may also include monitoring transmissions among the plurality of stations to detect integrity check values which do not correspond with their respective data packets, and generating an intrusion alert based thereon.

The data packets may be transmitted via a medium access control (MAC) layer, and the plurality of stations may also transmit a respective MAC sequence number with each data packet. Thus, the method may also include monitoring transmissions among the plurality of stations to detect usage of non-consecutive MAC sequence numbers by a station, and generating an intrusion alert based thereon.

Each data packet may also have a packet type associated therewith. The method may therefore also include monitoring transmissions among the plurality of stations to detect collisions of packets having a predetermined packet type and generating an intrusion alert based upon detecting a threshold number of collisions of packets having the predetermined packet type. By way of example, the predetermined packet type may include at least one of management frame packets (e.g., authentication, association, and beacon packets), control frame packets (e.g., request to send (RTS) and clear to send (CTS) packets), and data frame packets. Furthermore, the threshold number of collisions may be greater than about three. Moreover, the threshold number may be based upon a percentage of a total number of monitored packets having the predetermined packet type.

The plurality of stations may transmit data via a MAC layer, and each station may have a MAC address associated therewith to be transmitted with data sent therefrom, as noted above. Accordingly, the method may further include monitoring transmissions among the plurality of stations to detect collisions of a same MAC address, and generating an intrusion alert based upon detecting a threshold number of collisions of a same MAC address. By way of example, the threshold number of collisions may be greater than about three.

The method may also include monitoring transmissions among the plurality of stations to detect service set IDs associated therewith, and generating an intrusion alert based upon one of the detected service set IDs being different than the at least one service set ID of the wireless network. Also, transmissions may be detected over at least one channel which do not originate from one of the plurality of stations, and an intrusion alert may be generated based thereon. The intrusion alert may also be transmitted to at least one of the plurality of stations.

BRIEF DESCRIPTION OF THE DRAWINGS

FIG. 11 is a flow diagram illustrating an intrusion detection method in accordance with the present invention based upon detecting FCS errors.

FIG. 12 is a flow diagram illustrating an intrusion detection method in accordance with the present invention based upon detecting failed authentications of MAC addresses.

FIG. 13 is a flow diagram illustrating an intrusion detection method in accordance with the present invention based upon detecting illegal network allocation vector (NAV) values.

FIGS. 14 and 15 are flow diagrams illustrating intrusion detection methods in accordance with the present invention based upon detecting contention-free mode operation outside of a CFP and detecting contention mode operation during a CFP, respectively.

FIG. 16 is a flow diagram illustrating an intrusion detection method in accordance with the present invention based upon detecting transmissions occurring during an unauthorized period.

FIG. 17 is a flow diagram illustrating an intrusion detection method in accordance with the present invention based upon detecting integrity check values which do not correspond with their respective data packets.

FIG. 18 is a flow diagram illustrating an intrusion detection method in accordance with the present invention based upon detecting usage of non-consecutive MAC sequence numbers by a station.

FIG. 19 is a flow diagram illustrating an intrusion detection method in accordance with the present invention based upon detecting collisions of packets having a predetermined packet type.

FIG. 20 is a flow diagram illustrating an intrusion detection method in accordance with the present invention based upon detecting collisions of a same MAC address.

DETAILED DESCRIPTION OF THE PREFERRED EMBODIMENTS

Figure 1:
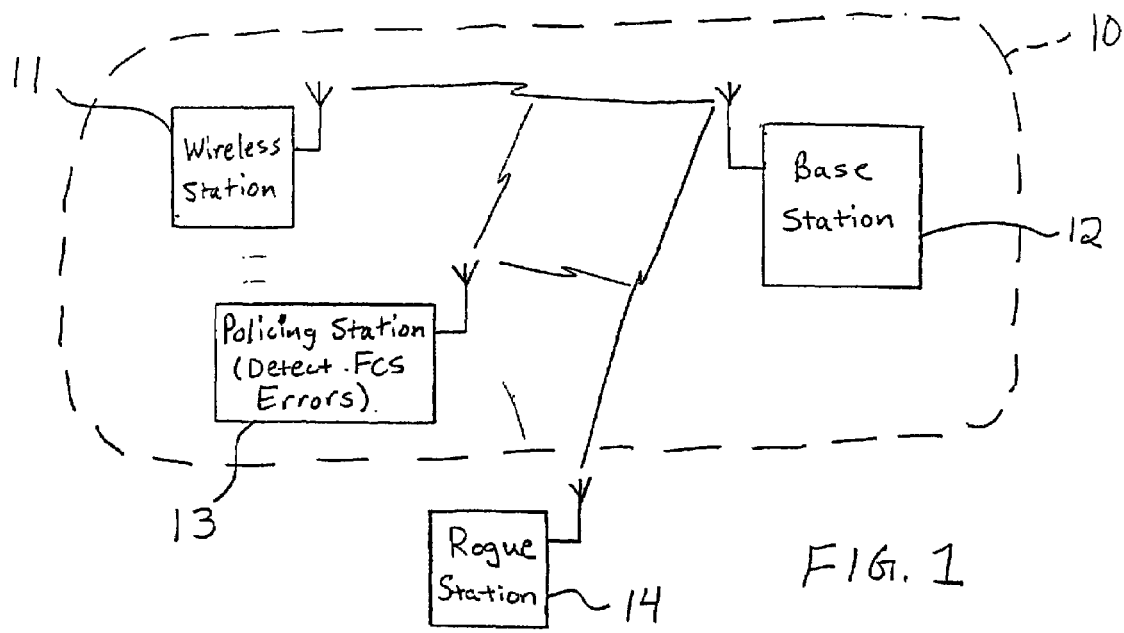
FIG. 1 is a schematic block diagram of a wireless LAN/MAN in accordance with the present invention for providing intrusion detection based upon frame check sequence (FCS) errors.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art For purposes of the foregoing discussion, like numbers refer to like elements throughout. Moreover, referring particularly to FIGS. 1-10, reference numerals differing by decades are used to indicate similar elements in alternate embodiments. For example, the wireless stations 11, 21, 31, 41, 51, 61, 71, 81, 91, and 101 illustrated in FIGS. 1-10 are all similar elements, and so on. As such, these elements may only be described in detail upon their first occurrence to avoid undue repetition, but later occurring elements are understood to be similar to those first described.

Referring now to FIG. 1, a wireless LAN/MAN 10 in accordance with the present invention illustratively includes a wireless station 11 and a base station (or access point) 12. While only a single wireless station 11 and base station 12 are shown for clarity of illustration, those of skill in the art will appreciate that any number of wireless and/or base stations may be included within the wireless network 10.

Before describing the wireless network 10 in further detail, a brief discussion regarding wireless LAN/MAN protocols is warranted. In particular, the foregoing discussion will assume a network implementation using the 802.11 standard for clarity of explanation. However, those of skill in the art will appreciate that numerous aspects and embodiments described herein may also be used with other suitable wireless LAN/MAN standards (e.g., Bluetooth, etc.).

The 802.11 standard is for use with the OSI network model for data transfer, which includes seven layers at which certain types of data are sent using various protocols. These layers include the application layer, presentation layer, session layer, transport layer, network layer, data link layer, and physical layer. The data link layer further includes media access control (MAC) and logical link control sub-layers. The wireless station 11 and base station 12 in particular use the MAC layer for transmitting data therebetween, particularly respective MAC addresses associated therewith, for example. Of course, the remaining layers of the OSI model may also be used for data transmission as well. Moreover, data is typically sent in packets, and various packets types are used for different types of message data, as will be described further below.

In accordance with the invention, the wireless network 10 illustratively includes a policing station 13 for detecting intrusions into the wireless network by a rogue station 14. By way of example, the rogue station 14 may be used by a would-be hacker attempting to hack into the wireless network 10, or it may simply be a node from a different wireless network that is operating too closely to the wireless network 10. The policing station 13 may include one or more of a wireless station and/or a base station. In the present example, the policing station 13 monitors transmissions among the stations 11, 12 to detect frame check sequence (FCS) errors from a MAC address. If a number of FCS errors detected for a given MAC address exceeds a threshold, the policing station 13 generates an intrusion alert based thereon.

It should be noted that, as used herein, the phrase "transmissions among the stations" is intended to mean any transmission directly to or from one of the stations 11, 12, as well as any transmission within an operating range of the wireless network 10. In other words, the policing station 13 may monitor transmissions directed to or originating from the stations 11, 12 as well as any other transmissions it may receive whether or not they are specifically directed to or originate from a station in the network 10.

In the above described embodiment (and those described below), the policing station 13 may advantageously transmit the alert to one or more of the stations 11, 12 in the wireless network 10. By way of example, the policing station 13 may transmit the intrusion alert directly to the base station 12, which may then notify all of the remaining stations in the wireless network. Alternately, the policing station 13 may broadcast the intrusion alert to all network stations. In either case, the appropriate countermeasures may then be taken to respond to the unauthorized intrusion, as will be appreciated by those skilled in the art. Such countermeasures are beyond the scope of the present invention and will therefore not be discussed herein.

Figure 2:
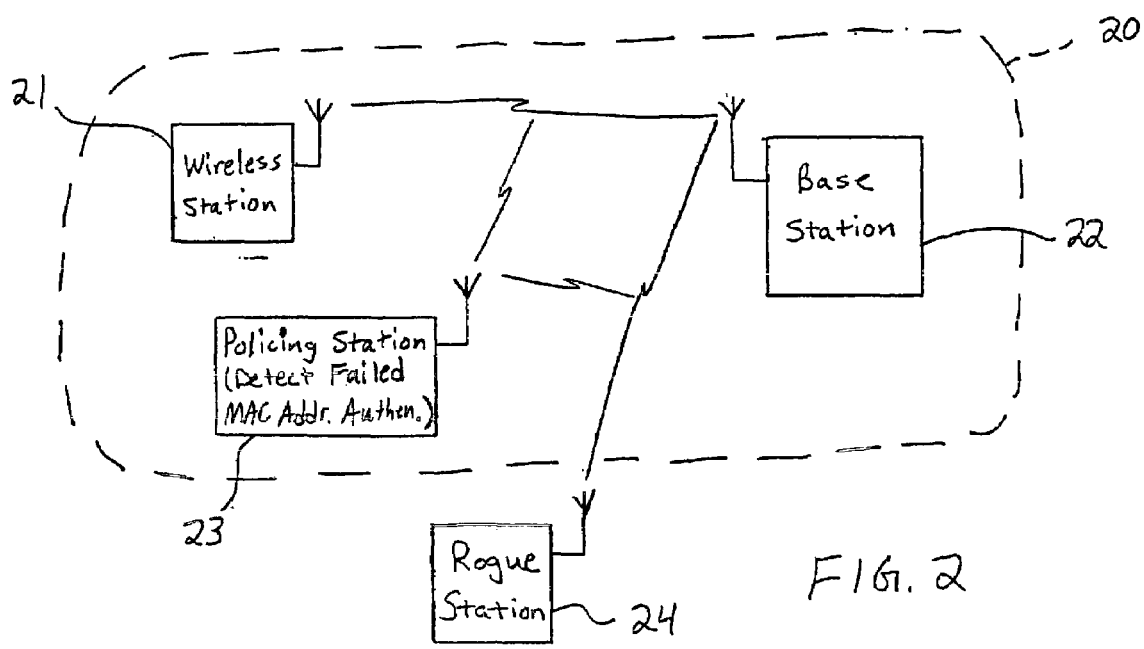
FIG. 2 is a schematic block diagram of an alternate embodiment of the wireless LAN/MAN of FIG. 1 for providing intrusion detection based upon failed authentications of media access control (MAC) addresses.

Turning now to FIG. 2, a first alternate embodiment of the wireless LAN/MAN 20 is now described. In this embodiment, the policing station 23 detects intrusions into the wireless network 20 by monitoring transmissions among the stations 21, 22 to detect failed attempts to authenticate MAC addresses. Upon detecting a certain predetermined number of failed attempts to authenticate a particular MAC address, the policing node 23 will generate an intrusion alert.

Any number of failed attempts may be used as the threshold for generating the intrusion alert, but it may generally be desirable to allow a station at least one attempt to authenticate its MAC address without generating the intrusion alert. Moreover, in some embodiments the policing station 23 may advantageously only generate the intrusion alert if the detected number of failures occur within a predetermined period (e.g., an hour, day, etc.).

In accordance with the 802.11 standard, two stations wishing to communicate with one another within a wireless LAN/MAN typically transmit request to send (RTS) and clear to send (CTS) packets therebetween prior to transmitting data. The reason for this is to avoid collisions with other transmissions. That is, since many or all of the remaining stations in the wireless LAN/MAN may be communicating on the same channel, the stations need to ensure that they are not transmitting at the same time as this could result in interference and network disruption. Moreover, RTS and CTS packets typically include a network allocation vector (NAV) indicating a time duration reserved for transmitting the data. This information is transmitted to all other stations in the wireless LAN/WAN, which will then stop transmission during the specified period.

Figure 3:
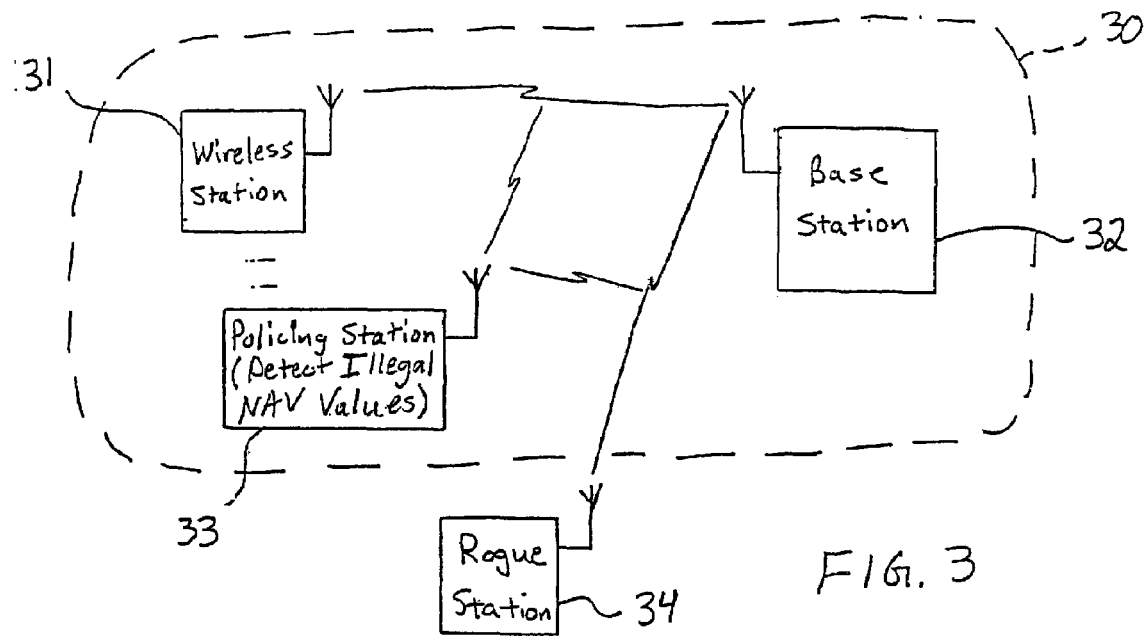
FIG. 3 is a schematic block diagram of another alternate embodiment of the wireless LAN/MAN of FIG. 1 for providing intrusion detection based upon illegal network allocation vectors (NAVs).

Turning now additionally to FIG. 3, a second alternate embodiment of the wireless LAN/MAN 30 is now described in which the policing station 33 detects intrusions into the wireless network 30 by monitoring RTS and CTS packets sent between the stations 31 and 32 to detect an illegal NAV value therein. For example, the wireless network 30 may be implemented in such a way that data transmission may not exceed a certain amount of time, which will be known to all of the authorized stations participating therein. Thus, if the policing station 33 detects a NAV value outside of the allotted amount of time, it will then generate an intrusion alert based thereon.

Another feature of the 802.11 standard is that stations within a wireless LAN/MAN may operate in contention or contention-free modes. That is, in a contention mode all stations are required to contend for access to the particular channel being used for each packet of data that is transmitted. During a contention-free period (CFP), medium usage is controlled by the base station, which thus eliminates the need for stations to contend for channel access.

Figure 4:
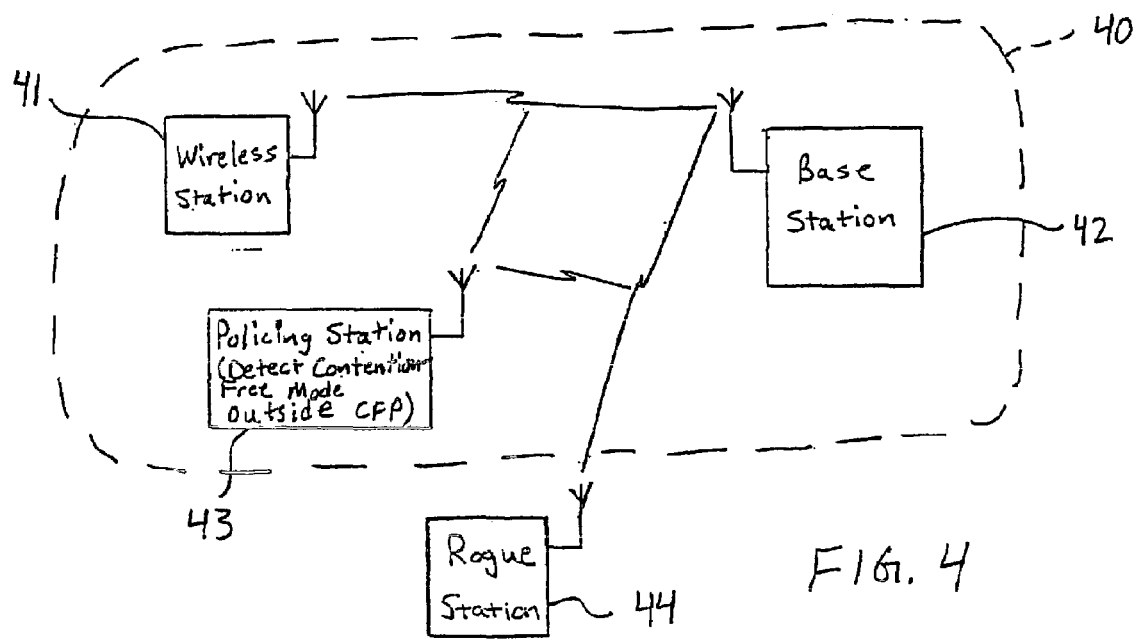
FIGS. 4 and 5 are schematic block diagrams of further alternate embodiments of the wireless LAN/MAN of FIG. 1 for providing intrusion detection based upon contention-free mode operation outside of a contention-free period (CFP) and based upon contention mode operation during a CFP, respectively.
Figure 5:
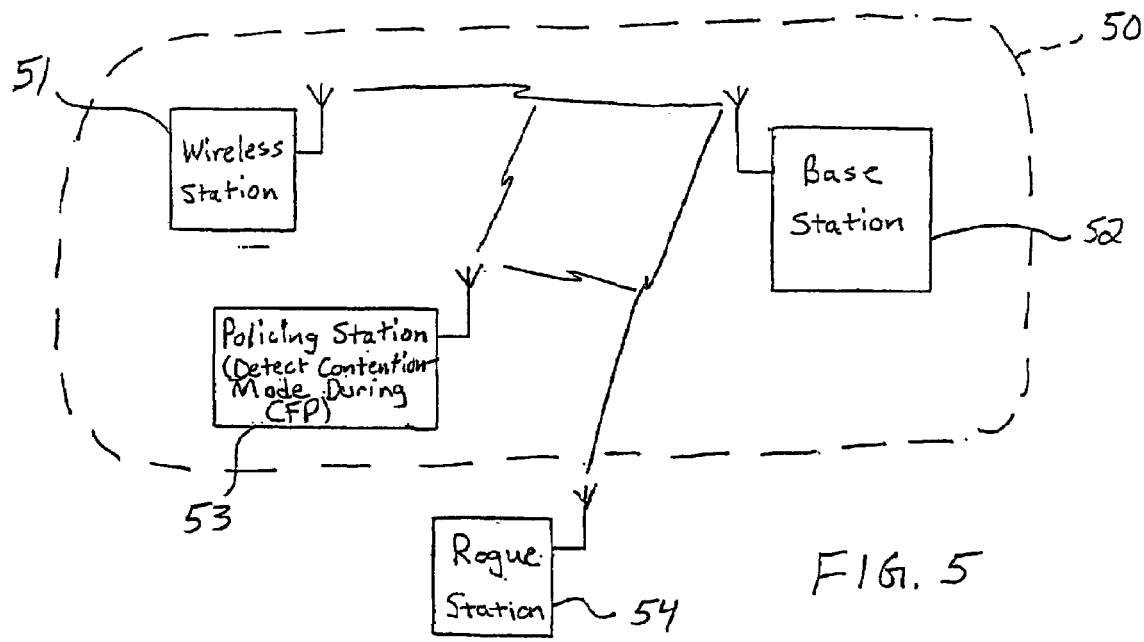

In accordance with a third embodiment of the wireless LAN/MAN 40 illustrated in FIG. 4, the policing station 43 may advantageously detect intrusions into the wireless network 40 by monitoring transmissions among the stations 41, 42 to detect contention-free mode operation outside of a CFP. As such, an intrusion alert may be generated by the policing station 43 based upon such detection. In other words, detection of a station operating in contention-free mode outside of a CFP indicates that this station is not an authorized station, as all authorized wireless stations will be informed by the base station 42 when a CFP has been instituted. Of course, this would also be the case when contention mode operation is detected during a CFP, and such embodiment is illustratively shown in FIG. 5. It will be appreciated by those skilled in the art that either one or both of the above CFP intrusion detection approaches may be implemented in a given application.

Figure 6:
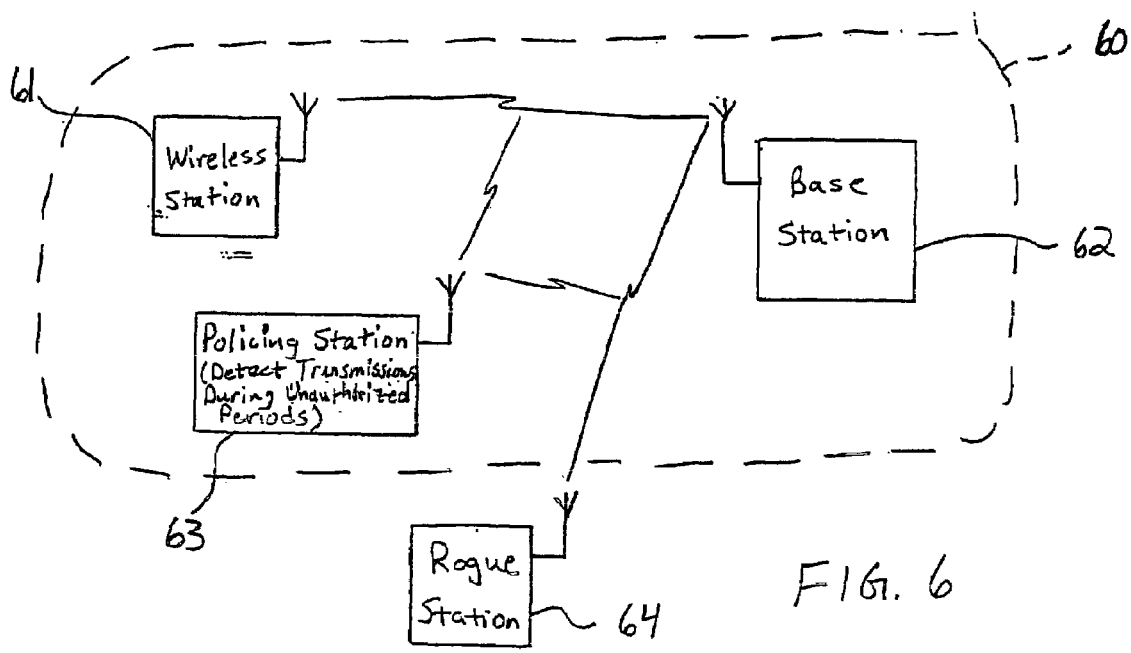
FIG. 6 is a schematic block diagram of another alternate embodiment of the wireless LAN/MAN of FIG. 1 for providing intrusion detection based upon transmissions occurring during an unauthorized period.

Referring now to FIG. 6, another embodiment of wireless LAN/MAN 60 is now described. Here, the policing station 63 detects intrusions into the wireless network 60 by monitoring transmissions among the stations 61, 62 to detect transmissions during an unauthorized period. That is, the wireless network 60 may be implemented such that no users are allowed to access the network during specified hours (e.g., between midnight and 6:00 AM). Thus, upon detecting transmissions within this unauthorized period, the policing station 63 may advantageously generate an intrusion alert.

Figure 7:
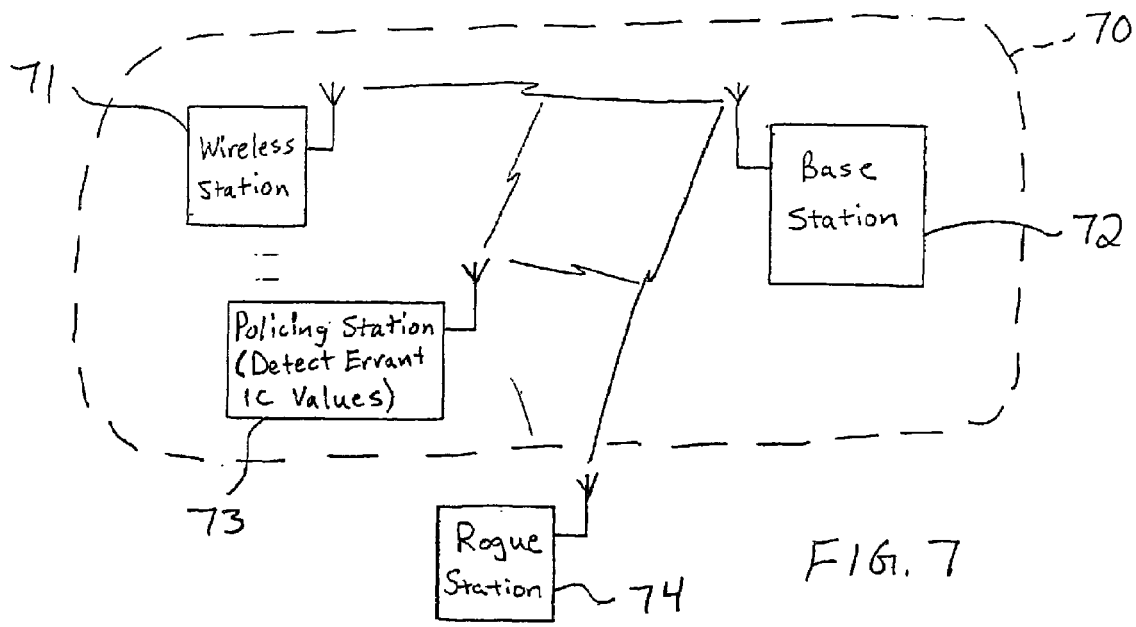
FIG. 7 is a schematic block diagram of still another alternate embodiment of the wireless LAN/MAN of FIG. 1 for providing intrusion detection based upon detecting integrity check values which do not correspond with their respective data packets.

Turning now additionally to FIG. 7, still another embodiment of the wireless LAN/MAN 70 is now described. In this embodiment, the various stations 71, 72 have the above described WEP feature enabled and therefore generate and transmit integrity check values with respective data packets sent therefrom. Thus, the policing station 73 detects intrusions into the wireless network 70 by monitoring transmissions among the stations 71, 72 to detect integrity check values which do not correspond with their respective data packets. That is, if an incorrect key stream is used to generate the message ciphertext, or if the message has been tampered with by the rouge station 84, integrity check value will most likely be corrupted. As such, the policing station 73 may generate an intrusion alert when such errant integrity check values are detected, as will be appreciated by those of skill in the art.

Figure 8:
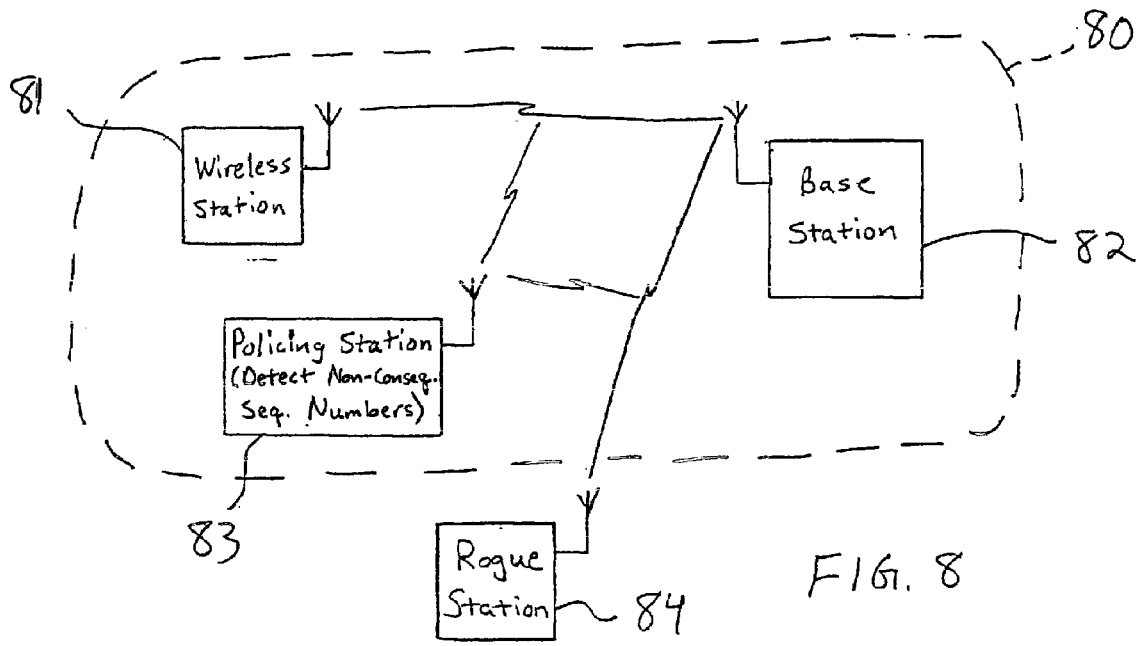
FIG. 8 is a schematic block diagram of yet another alternate embodiment of the wireless LAN/MAN of FIG. 1 for providing intrusion detection based upon detecting usage of non-consecutive MAC sequence numbers by a station.

Still another wireless LAN/MAN 80 in accordance with the invention is now described with reference to FIG. 8. Typically, when the above-noted OSI network model is used, a respective MAC sequence number is generated and sent with each data packet from the stations 81, 82. That is, with each successive data packet the MAC sequence number is incremented, and thus each packet has a unique MAC sequence number associated therewith. As such, the policing station 83 may detect intrusions into the wireless network 80 by monitoring transmissions among the stations 81, 82 to detect usage of non-consecutive MAC sequence numbers by a station, and generate an intrusion alert based thereon.

Figure 9:
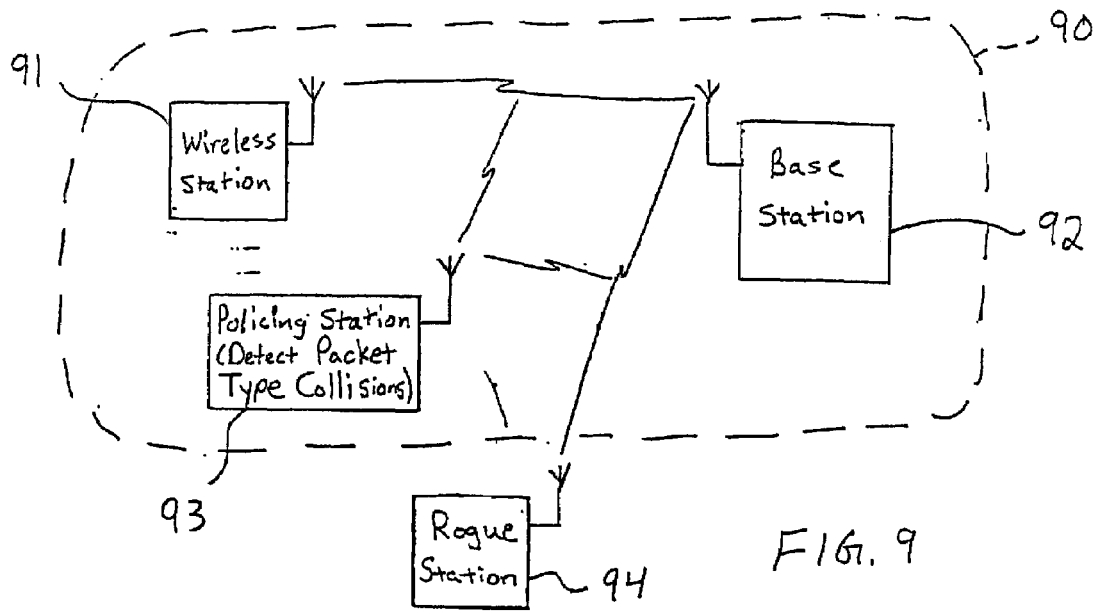
FIG. 9 is a schematic block diagram of another alternate embodiment of the wireless LAN/MAN of FIG. 1 for providing intrusion detection based upon detecting collisions of packets having a predetermined packet type.

Turning now additionally to FIG. 9, another embodiment of the wireless LAN/MAN 90 is illustrated in which the policing station 93 detects intrusions into the wireless network by monitoring transmissions among the stations 91, 92 to detect collisions of packets having a predetermined packet type. In particular, the predetermined packet type may include management frame packets (e.g., authentication, association, and beacon packets), control frame packets (e.g., RTS and CTS packets), and/or data frame packets. The policing station 93 may thus generate an intrusion alert based upon detecting a threshold number of collisions of the predetermined packet type.

As used herein, "collisions" is meant to include simultaneous transmission of packets as well as transmissions within a certain time of one another. That is, if a certain type of packet is supposed to have a time delay between transmissions, (e.g., a few seconds, etc.), if two such packet types are transmitted too close together (i.e., with less than the requisite delay time between them), this would be considered a collision. By way of example, the threshold number of collisions may be greater than about three, for example, although other thresholds may be used as well. Moreover, the threshold number may be based upon the particular packet type in question, i.e., the threshold number may be different for different packet types.

Additionally, the threshold number may be based upon a percentage of a total number of monitored packets having the predetermined packet type. For example, if a certain percentage (e.g., greater than about 10%) of packets transmitted during a period (e.g., one hour) are involved in collisions, then the intrusion alert may be generated. Alternatively, if a certain percentage of packets out of a total number of packets monitored (e.g., 3 out of 10) are involved in collisions, then the intrusion alert may be generated. Of course, other suitable threshold numbers and methods for establishing the same may also be used.

Figure 10:
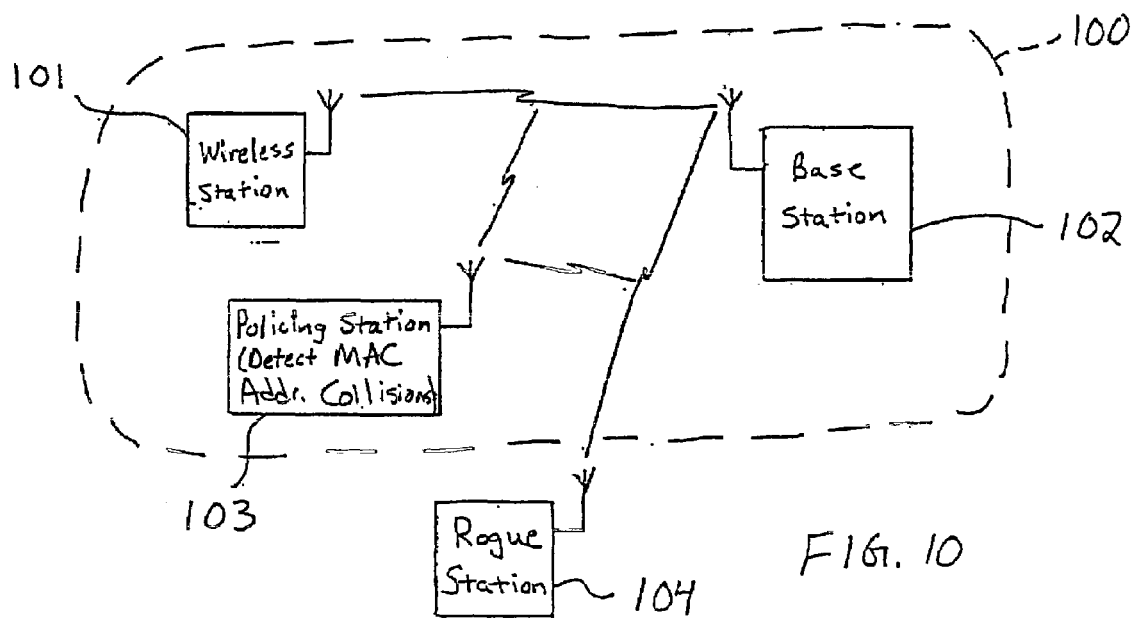
FIG. 10 is a schematic block diagram of yet another alternate embodiment of the wireless LAN/MAN of FIG. 1 for providing intrusion detection based upon detecting collisions of a same MAC address.

Referring now to FIG. 10, another embodiment of the wireless LAN/MAN 100 is described in which the policing station 103 detects intrusions into the wireless network by monitoring transmissions among the stations 101, 102 to detect collisions of a same MAC address. That is, if multiple terminals lay claim to the same MAC address simultaneously or relatively closely to one another, then either an error has occurred or one of the stations is a rouge station 104. As such, the policing station 103 generates an intrusion alert based upon detecting a threshold number of such collisions, e.g., greater than about three. Here again, other threshold numbers may also be used, and the threshold number may be based upon a percentage, as previously described above.

An intrusion detection method aspect of the invention for the wireless network 10 will now be described with reference to FIG. 11. Beginning at Block 110, the method includes transmitting data between the plurality of stations 11, 12 using the MAC layer, as previously noted above, at Block 111. The transmissions among the stations 11, 12 are monitored to detect FCS errors from one of the MAC addresses, at Block 112. If a number of FCS errors for the MAC address exceeds a threshold, at Block 113, an intrusion alert is generated based thereon, at Block 114, thus ending the method (Block 115). Otherwise, the transmissions will continue to be monitored, as illustratively shown.

In accordance with a first alternate method aspect of the invention now described with reference to FIG. 12, the method begins (Block 120) with transmitting data between the stations 21, 22, at Block 121, and monitoring transmissions to detect failed attempts to authenticate MAC addresses, at Block 122, as previously noted above. If a number of failed attempts to authenticate a MAC address is detected, at Block 123, then an intrusion is generated, at Block 124, thus concluding the method (Block 125). Otherwise, the intrusion monitoring may continue, as illustratively shown.

A second alternate method aspect of the invention will now be described with reference to FIG. 13. The method begins (Block 130) with transmitting RTS and CTS packets between the stations 31, 32 and then transmitting data, at Block 131. The RTS and CTS packets transmitted between the stations 31, 32 are monitored to detect an illegal NAV value therein, at Block 132, as previously described above. If an illegal NAV value is detected, at Block 133, an intrusion alert is generated based thereon, at Block 134, thus concluding the method (Block 135). Otherwise, the intrusion monitoring may continue, as illustratively shown.

Turning now to FIG. 14, a third alternate method aspect of the invention is now described. The method begins (Block 140) with transmitting data between the stations 41, 42, at Block 141, and monitoring transmissions to detect contention-free mode operation outside of a CFP, at Block 142, as previously described above. If such operation is detected outside a CFP, at Block 143, an intrusion alert is generated based thereon, at Block 144, thus concluding the method (Block 145). Otherwise, the intrusion monitoring may continue, as illustratively shown. The opposite case in which transmissions are monitored for contention mode operation during CFPs is illustratively shown in FIG. 15 at Blocks 150-155. Here again, both of these methods could be used in a single embodiment, though this need not always be the case.

A fourth method aspect of the invention will now be described with reference to FIG. 16. The method begins (Block 160) with transmitting data between the stations 61, 62, at Block 161, and monitoring to detect transmissions during an unauthorized period, at Block 162, as previously described above. If transmissions are detected during an unauthorized period, at Block 163, an intrusion alert is generated based thereon, at Block 164 thus concluding the method (Block 165). Otherwise, the intrusion monitoring may continue, as illustratively shown.

Yet another intrusion detection method aspect of the invention will now be described with reference to FIG. 17. The method begins (Block 170) with transmitting data between the stations 71, 72, at Block 171, and monitoring transmissions 172 to detect integrity check values which do not correspond with their respective data packets, as previously described above. If this is the case, an intrusion alert is generated, at Block 173, thus ending the method (Block 175). Otherwise, the intrusion monitoring may continue, as illustratively shown.

Turning now to FIG. 18, still another method aspect of the invention is described. The method begins (Block 180) with transmitting data between the stations 81, 82, at Block 181. Thus, the method may also include monitoring transmissions to detect usage of non-consecutive MAC sequence numbers by a station, at Block 182, as previously described above. If such usage is detected, at Block 183, an intrusion alert is generated, at Block 184, thus ending the method (Block 185). Otherwise, the intrusion monitoring may continue, as illustratively shown.

Referring additionally to FIG. 19, another method aspect of the invention begins (Block 190) with transmitting data packets between the stations 91, 92, at Block 201, and monitoring transmissions to detect collisions of packets having a predetermined packet type, as noted above, at Block 192. If a threshold number of collisions of packets having the predetermined packet type are detected, at Block 193, then an intrusion alert is generated, at Block 194, ending the method (Block 195). Otherwise, the intrusion monitoring may continue, as illustratively shown.

Another intrusion detection method aspect of the invention will now be described with respect to FIG. 20. The method begins (Block 200) with transmitting data between the stations 101, 102, and monitoring transmissions to detect collisions of a same MAC address, at Block 202, as previously described above. If a threshold number of collisions of a same MAC address are detected, at Block 203, an intrusion alert is generated, at Block 204, thus ending the method (Block 205). Otherwise, the intrusion monitoring may continue, as illustratively shown.

Figure 21:
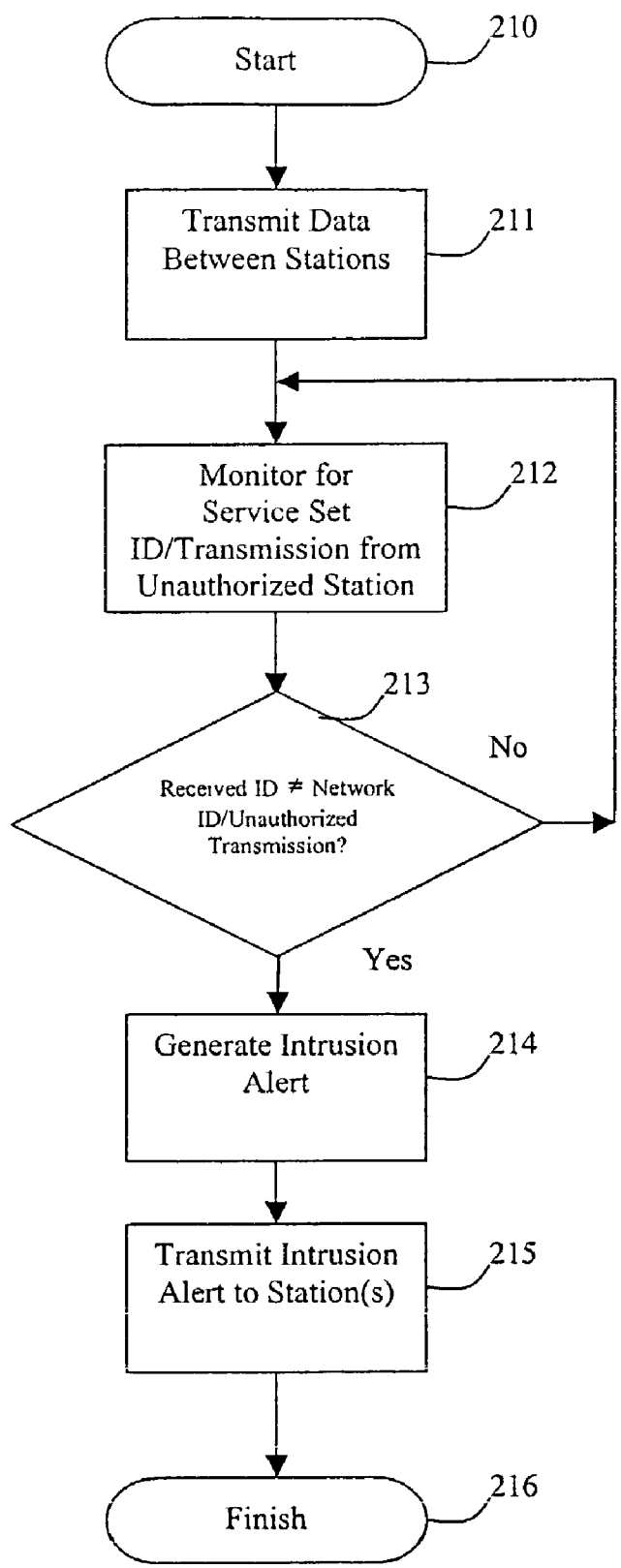
FIG. 21 is a flow chart illustrating additional method aspects of the invention for intrusion detection.

Further intrusion detection aspects of the invention will now be described with reference to FIG. 21. As noted above, a wireless LAN/MAN typically has one or more service set IDs associated therewith, such as IBSSIDs, BSSIDs, and/or ESSIDs. As illustratively shown, beginning at Block 210 data transmission may be sent between the stations 11, 12, at Block 211, and transmissions among the plurality of stations may be monitored to detect service set IDs associated therewith and/or transmissions over a designated network channel not originating from an authorized station, at Block 212.

As such, if a service set ID that is different from an authorized service set ID of the wireless network 10 and/or transmission from an unauthorized station on a network channel is detected, at Block 213, an intrusion alert may be generated based thereon, at Block 214. Moreover, the intrusion alert may advantageously be transmitted to one or more stations in the network, as previously described above, or to another source via modem, etc., at Block 215. Otherwise, the intrusion monitoring may continue, as illustratively shown.

It will be understood by those skilled in the art that the above described method aspects may all be implemented in one or more of the wireless networks described above. Also, additional method aspects of the invention will be apparent to those of skill in the art based upon the above description and will therefore not be discussed further herein.

It will also be appreciated that the above described invention may be implemented in several ways. For example, the policing station 13 could be implemented in one or more separate, dedicated devices that are not already part of the wireless network 10. Alternately, the invention may be implemented in software to be installed on one or more existing stations in a wireless LAN/MAN where intrusion detection is desired.

Further, many of the above-described aspects of the present invention may advantageously be used for detecting wireless network intrusion even when a rogue station has an authorized network or MAC ID (e.g., contention-free operation outside a CFP, transmission during an unauthorized period, etc.) Moreover, one or more of the above aspects may advantageously be used in a given application to provide a desired level of intrusion detection A further advantage of the invention is that it may be used to supplement existing intrusion detection systems, particularly those that focus on intrusion in the upper OSI network layers.

Additional features of the invention may be found in the co-pending application entitled WIRELESS LOCAL OR METROPOLITAN AREA NETWORK WITH INTRUSION DETECTION FEATURES AND RELATED METHODS, Ser. No. 10/217,042, the entire disclosure of which is hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless local or metropolitan area network comprising:
   a plurality of stations for transmitting data in packets therebetween and generating respective integrity check values for transmission with each packet; and
   a policing station for detecting intrusions into the wireless network by
      monitoring transmissions among said plurality of stations to detect transmissions during an unauthorized period and integrity check values which do not correspond with their respective data packets; and
      generating an intrusion alert based upon detecting transmissions during the unauthorized period and an integrity check value which does not correspond with its respective data packet.

2. The wireless network of claim 1 wherein said plurality of stations transmit data in packets via a medium access control (MAC) layer and also transmit a respective MAC sequence number with each data packet; and wherein said policing station further detects intrusions into the wireless network by:
   monitoring transmissions among said plurality of stations to detect usage of non-consecutive MAC sequence numbers by a station; and
   generating an intrusion alert based upon detecting usage of non-consecutive MAC sequence numbers by a station.

3. The wireless network of claim 1 wherein said plurality of stations transmit data in packets each having a packet type associated therewith; and wherein said policing station further detects intrusions into the wireless network by:
   monitoring transmissions among said plurality of stations to detect collisions of packets having a predetermined packet type; and
   generating an intrusion alert based upon detecting a threshold number of collisions of packets having the predetermined packet type.

4. The wireless network of claim 3 wherein the predetermined packet type comprises at least one of authentication packets, association packets, beacon packets, request to send (RTS) packets, and clear to send (CTS) packets.

5. The wireless network of claim 3 wherein the threshold number of collisions is greater than about three.

6. The wireless network of claim 3 wherein the threshold number is based upon a percentage of a total number of monitored packets having the predetermined packet type.

7. The wireless network of claim 1 wherein said plurality of stations transmit data via a medium access control (MAC) layer; wherein each station has a MAC address associated therewith to be transmitted with data sent therefrom; and wherein said policing station further detects intrusions into the wireless network by:
   monitoring transmissions among said plurality of stations to detect collisions of a same MAC address; and
   generating an intrusion alert based upon detecting a threshold number of collisions of a same MAC address.

8. The wireless network of claim 7 wherein the threshold number of collisions is greater than about three.

9. The wireless network of claim 1 wherein the wireless network has at least one service set identification (ID) associated therewith; and wherein said policing station further detects intrusions into the wireless network by:
   monitoring transmissions among said plurality of stations to detect service set IDs associated therewith; and
   generating an intrusion alert based upon one of the detected service set IDs being different than the at least one service set ID of the wireless network.

10. The wireless network of claim 1 wherein said plurality of stations transmit over at least one channel;
    and wherein said policing station further detects transmissions over the at least one channel not originating from one of the plurality of stations and generates an intrusion alert based thereon.

11. The wireless network of claim 1 wherein said policing station further transmits an intrusion alert to at least one of said plurality of stations.

12. The wireless network of claim 1 wherein said policing station comprises a base station.

13. The wireless network of claim 1 wherein said policing station comprises a wireless station.

14. A wireless local or metropolitan area network comprising:
    a plurality of stations for transmitting data in packets each having a packet type associated therewith and generating respective integrity check values for transmission with each packet; and
    a policing station for detecting intrusions into the wireless network by
       monitoring transmissions among said plurality of stations to detect transmissions during an unauthorized period, integrity check values which do not correspond with their respective data packets, and collisions of packets having a predetermined packet type; and
       generating an intrusion alert based upon detecting transmissions during the unauthorized period, an integrity check value which does not correspond with its respective data packet, and a threshold number of collisions of packets having the predetermined packet type.

15. The wireless network of claim 14 wherein said plurality of stations transmit data in packets via a medium access control (MAC) layer and also transmit a respective MAC sequence number with each data packet; and wherein said policing station further detects intrusions into the wireless network by:
monitoring transmissions among said plurality of stations to detect usage of non-consecutive MAC sequence numbers by a station; and
generating an intrusion alert based upon detecting usage of non-consecutive MAC sequence numbers by a station.

16. The wireless network of claim 14 wherein the predetermined packet type comprises at least one of authentication packets, association packets, beacon packets, request to send (RTS) packets, and clear to send (CTS) packets.

17. The wireless network of claim 14 wherein the threshold number of collisions is greater than about three.

18. The wireless network of claim 14 wherein the threshold number is based upon a percentage of a total number of monitored packets having the predetermined packet type.

19. The wireless network of claim 18 wherein the threshold number of collisions is greater than about three.

20. The wireless network of claim 14 wherein said plurality of stations transmit data via a medium access control (MAC) layer; wherein each station has a MAC address associated therewith to be transmitted with data sent therefrom; and wherein said policing station further detects intrusions into the wireless network by:
monitoring transmissions among said plurality of stations to detect collisions of a same MAC address; and
generating an intrusion alert based upon detecting a threshold number of collisions of a same MAC address.

21. The wireless network of claim 14 wherein said policing station further transmits an intrusion alert to at least one of said plurality of stations.

22. The wireless network of claim 14 wherein said policing station comprises at least one of a base station and a wireless station.

23. A wireless local or metropolitan area network comprising:
a plurality of stations for transmitting data in packets via a medium access control (MAC) layer and also for transmitting a respective MAC sequence number with each data packet data; and
a policing station for detecting intrusions into the wireless network by
monitoring transmissions among said plurality of stations to detect usage of non-consecutive MAC sequence numbers by a station; and
generating an intrusion alert based upon detecting usage of non-consecutive MAC sequence numbers by a station.

24. The wireless network of claim 23 wherein said plurality of stations transmit data in packets each having a packet type associated therewith; and wherein said policing station further detects intrusions into the wireless network by:
monitoring transmissions among said plurality of stations to detect collisions of packets having a predetermined packet type; and
generating an intrusion alert based upon detecting a threshold number of collisions of packets having the predetermined packet type.

25. The wireless network of claim 24 wherein the predetermined packet type comprises at least one of authentication packets, association packets, beacon packets, request to send (RTS) packets, and clear to send (CTS) packets authentication packets, association packets, beacon packets, request to send (RTS) packets, and clear to send (CTS) packets.

26. The wireless network of claim 24 wherein the threshold number of collisions is greater than about three.

27. The wireless network of claim 24 wherein the threshold number is based upon a percentage of a total number of monitored packets having the predetermined packet type.

28. The wireless network of claim 23 wherein said plurality of stations transmit data via a medium access control (MAC) layer; wherein each station has a MAC address associated therewith to be transmitted with data sent therefrom; and wherein said policing station further detects intrusions into the wireless network by:
monitoring transmissions among said plurality of stations to detect collisions of a same MAC address; and
generating an intrusion alert based upon detecting a threshold number of collisions of a same MAC address.

29. The wireless network of claim 28 wherein the threshold number of collisions is greater than about three.

30. The wireless network of claim 23 wherein said policing station further transmits an intrusion alert to at least one of said plurality of stations.

31. The wireless network of claim 23 wherein said policing station comprises at least one of a base station and a wireless station.

32. A wireless local or metropolitan area network comprising:
a plurality of stations for transmitting data in packets each having a packet type associated therewith; and
a policing station for detecting intrusions into the wireless network by
monitoring transmissions among said plurality of stations to detect collisions of packets having a predetermined packet type; and
generating an intrusion alert based upon detecting a threshold number of collisions of packets having the predetermined packet type.

33. The wireless network of claim 32 wherein the predetermined packet type comprises at least one of authentication packets, association packets, beacon packets, request to send (RTS) packets, and clear to send (CTS) packets.

34. The wireless network of claim 32 wherein the threshold number of collisions is greater than about three.

35. The wireless network of claim 32 wherein the threshold number is based upon a percentage of a total number of monitored packets having the predetermined packet type.

36. The wireless network of claim 32 wherein said plurality of stations transmit data via a medium access control (MAC) layer; wherein each station has a MAC address associated therewith to be transmitted with data sent therefrom; and wherein said policing station further detects intrusions into the wireless network by:
monitoring transmissions among said plurality of stations to detect collisions of a same MAC address; and
generating an intrusion alert based upon detecting a threshold number of collisions of a same MAC address.

37. The wireless network of claim 32 wherein the threshold number of collisions is greater than about three.

38. The wireless network of claim 32 wherein said policing station further transmits an intrusion alert to at least one of said plurality of stations.

39. The wireless network of claim 32 wherein said policing station comprises at least one of a base station and a wireless station.

40. A wireless local or metropolitan area network comprising:
a plurality of stations for transmitting data via a medium access control (MAC) layer, each station having a MAC address associated therewith to be transmitted with data sent therefrom; and
a policing station for detecting intrusions into the wireless network by
monitoring transmissions among said plurality of stations to detect collisions of a same MAC address; and
generating an intrusion alert based upon detecting a threshold number of collisions of a same MAC address.

41. The wireless network of claim 40 wherein the threshold number of collisions is greater than about three.

42. The wireless network of claim 40 wherein said policing station further transmits an intrusion alert to at least one of said plurality of stations.

43. The wireless network of claim 40 wherein said policing station comprises at least one of a base station and a wireless station.

44. An intrusion detection method for a wireless local or metropolitan area network comprising a plurality of stations, the method comprising:
transmitting data between the plurality of stations in packets and generating respective integrity check values for transmission with each packet;
monitoring transmissions among the plurality of stations to detect transmissions during an unauthorized period and integrity check values which do not correspond with their respective data packets; and
generating an intrusion alert based upon detecting transmissions during the unauthorized period and an integrity check value which does not correspond with its respective data packet.

45. The method of claim 44 wherein the plurality of stations transmit data in packets via a medium access control (MAC) layer and also transmit a respective MAC sequence number with each data packet; and further comprising:
monitoring transmissions among the plurality of stations to detect usage of non-consecutive MAC sequence numbers by a station; and
generating an intrusion alert based upon detecting usage of non-consecutive MAC sequence numbers by a station.

46. The method of claim 44 wherein the plurality of stations transmit data in packets each having a packet type associated therewith; and further comprising:
monitoring transmissions among the plurality of stations to detect collisions of packets having a predetermined packet type; and
generating an intrusion alert based upon detecting a threshold number of collisions of packets having the predetermined packet type.

47. The method of claim 46 wherein the predetermined packet type comprises at least one of authentication packets, association packets, beacon packets, request to send (RTS) packets, and clear to send (CTS) packets.

48. The method of claim 46 wherein the threshold number of collisions is greater than about three.

49. The method of claim 46 wherein the threshold number is based upon a percentage of a total number of monitored packets having the predetermined packet type.

50. The method of claim 49 wherein the threshold number of collisions is greater than about three.

51. The method of claim 44 wherein the plurality of stations transmit data via a medium access control (MAC) layer, and wherein each station has a MAC address associated therewith to be transmitted with data sent therefrom; and further comprising:
monitoring transmissions among the plurality of stations to detect collisions of a same MAC address; and
generating an intrusion alert based upon detecting a threshold number of collisions of a same MAC address.

52. The method of claim 44 wherein the wireless network has at least one service set identification (ID) associated therewith; and further comprising:
monitoring transmissions among the plurality of stations to detect service set IDs associated therewith; and
generating an intrusion alert based upon one of the detected service set IDs being different than the at least one service set ID of the wireless network.

53. The method of claim 44 wherein the plurality of stations transmit over at least one channel; and further comprising detecting transmissions over the at least one channel not originating from one of the plurality of stations and generating an intrusion alert based thereon.

54. The method of claim 44 further comprising transmitting the intrusion alert to at least one of the plurality of stations.

55. An intrusion detection method for a wireless local or metropolitan area network comprising a plurality of stations, the method comprising:
transmitting data between the plurality of stations in packets each having a packet type associated therewith and generating respective integrity check values for transmission with each packet;
monitoring transmissions among said plurality of stations to detect transmissions during an unauthorized period, integrity check values which do not correspond with their respective data packets, and collisions of packets having a predetermined packet type; and
generating an intrusion alert based upon detecting transmissions during the unauthorized period, an integrity check value which does not correspond with its respective data packet, and a threshold number of collisions of packets having the predetermined packet type.

56. The method of claim 55 wherein the plurality of stations transmit data in packets via a medium access control (MAC) layer and also transmit a respective MAC sequence number with each data packet; and further comprising:
monitoring transmissions among the plurality of stations to detect usage of non-consecutive MAC sequence numbers by a station; and
generating an intrusion alert based upon detecting usage of non-consecutive MAC sequence numbers by a station.

57. The method of claim 55 wherein the predetermined packet type comprises at least one of authentication packets, association packets, beacon packets, request to send (RTS) packets, and clear to send (CTS) packets.

58. The method of claim 55 wherein the threshold number of collisions is greater than about three.

59. The method of claim 55 wherein the threshold number is based upon a percentage of a total number of monitored packets having the predetermined packet type.

60. The method of claim 59 wherein the threshold number of collisions is greater than about three.

61. The method of claim 59 further comprising transmitting the intrusion alert to at least one of the plurality of stations.

62. The method of claim 55 wherein the plurality of stations transmit data packets via a medium access control (MAC) layer, and wherein each station has a MAC address associated therewith to be transmitted with data sent therefrom; and further comprising:
monitoring transmissions among the plurality of stations to detect collisions of a same MAC address; and
generating an intrusion alert based upon detecting a threshold number of collisions of a same MAC address.

63. An intrusion detection method for a wireless local or metropolitan area network comprising a plurality of stations, the method comprising:
transmitting data in packets via a medium access control (MAC) layer and transmitting a respective MAC sequence number with each data packet data;
monitoring transmissions among the plurality of stations to detect usage of non-consecutive MAC sequence numbers by a station; and
generating an intrusion alert based upon detecting usage of non-consecutive MAC sequence numbers by a station.

64. The method of claim 63 wherein each data packet has a packet type associated therewith; and further comprising:
monitoring transmissions among the plurality of stations to detect collisions of packets having a predetermined packet type; and
generating an intrusion alert based upon detecting a threshold number of collisions of packets having the predetermined packet type.

65. The method of claim 64 wherein the predetermined packet type comprises at least one of authentication packets, association packets, beacon packets, request to send (RTS) packets, and clear to send (CTS) packets.

66. The method of claim 63 wherein the threshold number of collisions is greater than about three.

67. The method of claim 63 wherein the threshold number is based upon a percentage of a total number of monitored packets having the predetermined packet type.

68. The method of claim 63 wherein the plurality of stations transmit data packets via a medium access control (MAC) layer, and wherein each station has a MAC address associated therewith to be transmitted with data sent therefrom; and further comprising:
monitoring transmissions among the plurality of stations to detect collisions of a same MAC address; and
generating an intrusion alert based upon detecting a threshold number of collisions of a same MAC address.

69. The method of claim 68 wherein the threshold number of collisions is greater than about three.

70. The method of claim 63 further comprising transmitting the intrusion alert to at least one of the plurality of stations.

71. An intrusion detection method for a wireless local or metropolitan area network comprising a plurality of stations, the method comprising:
transmitting data in packets between the plurality of stations, each packet having a packet type associated therewith;
monitoring transmissions among the plurality of stations to detect collisions of packets having a predetermined packet type; and
generating an intrusion alert based upon detecting a threshold number of collisions of packets having the predetermined packet type.

72. The method of claim 71 wherein the predetermined packet type comprises at least one of authentication packets, association packets, beacon packets, request to send (RTS) packets, and clear to send (CTS) packets.

73. The method of claim 71 wherein the threshold number of collisions is greater than about three.

74. The method of claim 71 wherein the threshold number is based upon a percentage of a total number of monitored packets having the predetermined packet type.

75. The method of claim 71 wherein the plurality of stations transmit data packets via a medium access control (MAC) layer, and wherein each station has a MAC address associated therewith to be transmitted with data packets sent therefrom; and further comprising:
monitoring transmissions among the plurality of stations to detect collisions of a same MAC address; and
generating an intrusion alert based upon detecting a threshold number of collisions of a same MAC address.

76. The method of claim 75 wherein the threshold number of collisions is greater than about three.

77. The method of claim 71 further comprising transmitting the intrusion alert to at least one of the plurality of stations.

78. An intrusion detection method for a wireless local or metropolitan area network comprising a plurality of stations, the method comprising:
transmitting data via a medium access control (MAC) layer between the plurality of stations, each station having a MAC address associated therewith to be transmitted with data sent therefrom;
monitoring transmissions among the plurality of stations to detect collisions of a same MAC address; and
generating an intrusion alert based upon detecting a threshold number of collisions of a same MAC address.

79. The method of claim 78 wherein the threshold number of collisions of a same MAC address is greater than about three.

80. The method of claim 78 further comprising transmitting the intrusion alert to at least one of the plurality of stations.

* * * * *